Aug. 15, 1939.       H. MOLZ       2,169,498
DEVICE FOR CONTROLLING AND PLANNING PRODUCTION,
ORDER DISPATCHING, STORES, AND SALES
Filed Jan. 25, 1938       2 Sheets-Sheet 1
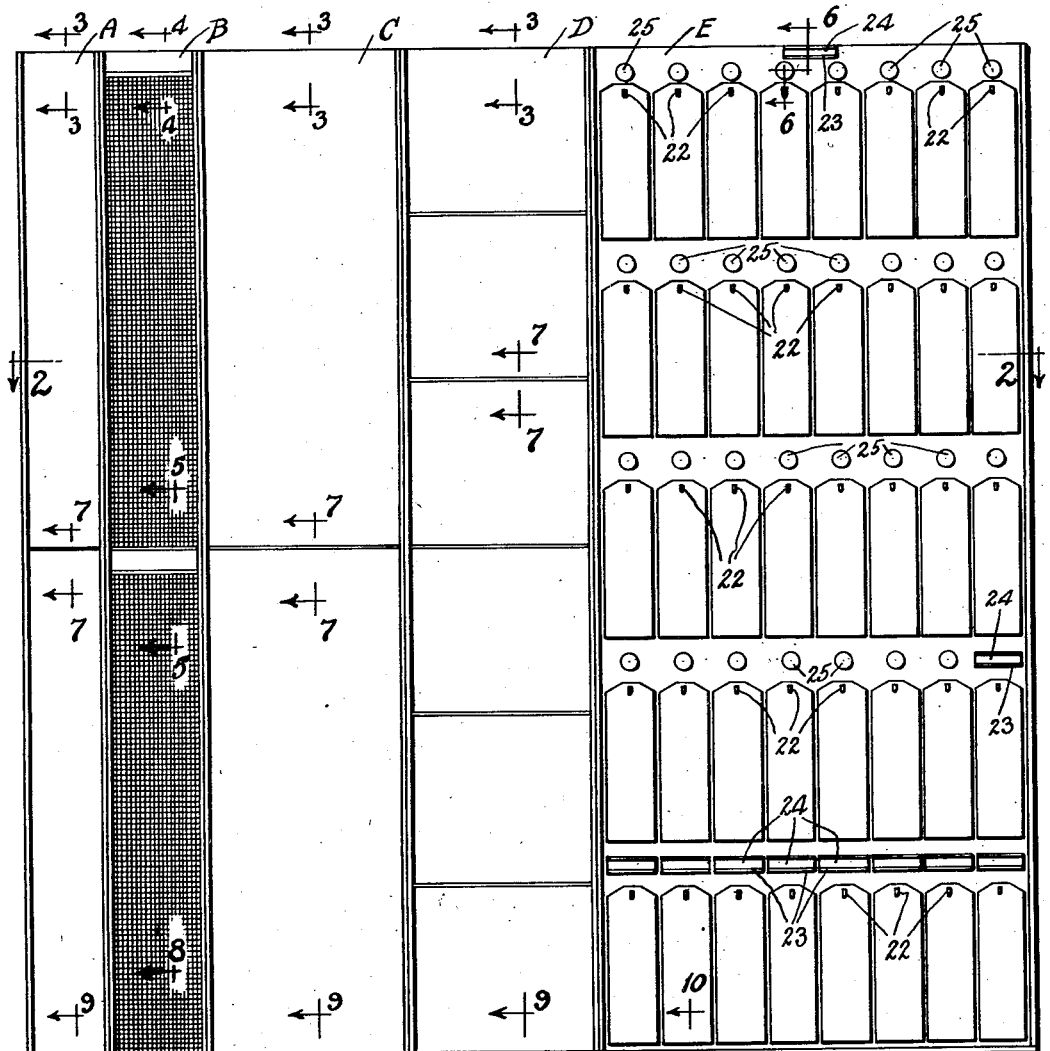
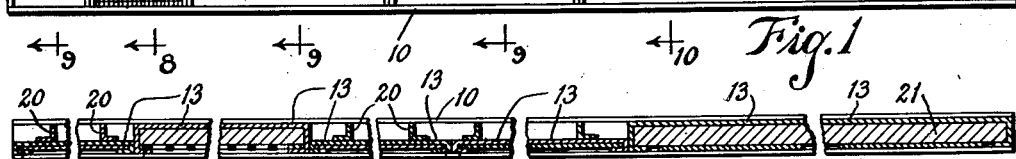
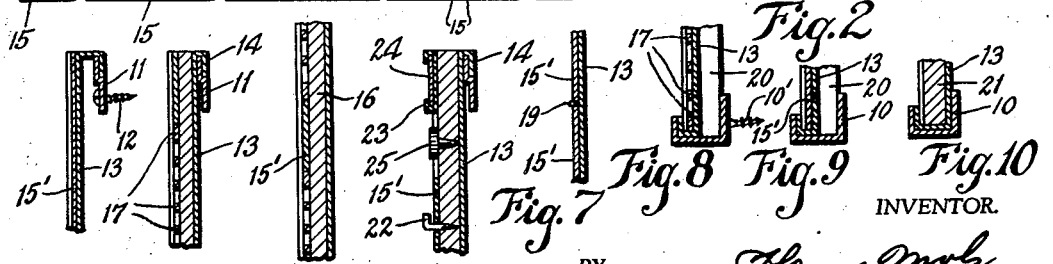
INVENTOR.
Henry Molz
BY Aug. 15, 1939.   H. MOLZ   2,169,498
DEVICE FOR CONTROLLING AND PLANNING PRODUCTION,
ORDER DISPATCHING, STORES, AND SALES
Filed Jan. 25, 1938   2 Sheets-Sheet 2

| STOCK CONTROL | | | | | | | | |
|---|---|---|---|---|---|---|---|---|
| NOTE! IN WHITE = UNFINISHED STOCK  RESERVED = STOCK SOLD WAITING SHIPMENT. | | | | | KD = KNOCKED DOWN.  SU = SET UP. | | | |
| PATTERN NO. | ARTICLE | COLOR | ON ORDER | DATE XPECTED | FINISH DEPT. | IN WHITE | | RESERV'D |
| | | | | | | KD | SU | |
| | | | | | | | | |
| | | | | | | | | |
| | | | | | | | | |
| | | | | | | | | |
| | | | | | | | | |
| | | | | | | | | |

*Fig. 11*

| PRODUCTION PLANNING. | | | | | | |
|---|---|---|---|---|---|---|
| PATTERN | | | | | | |
| ON ORDER | | | | | | |
| TOTAL OUT | | | | | | |
| BALANCE DUE | | | | | | |
| WANTED THIS MO. | | | | | | |
| WANTED PER DAY | | | | | | |
| DAILY PRODUCTION | OUT | TOTAL | OUT | TOTAL | OUT | TOTAL |
| 31 | | | | | | |
| 30 | | | | | | |
| 29 | | | | | | |
| 28 | | | | | | |
| 27 | | | | | | |
| 4 | | | | | | |
| 3 | | | | | | |
| 2 | | | | | | |
| 1 | | | | | | |

*Fig. 15*

| STOCK RECORD |
|---|
| BLACK PINS IN LINE = STOCK-RESERVE.  RED PINS IN LINE = STOCK OVERSOLD. |

| 1 | 2 | 3 | 4 | 5 | 10 | 15 | 20 | 25 | 30 | 35 | 40 | 45 | 50 | 100 | 200 | 300 | 400 | 500 | 750 | 1000 |
|---|---|---|---|---|---|---|---|---|---|---|---|---|---|---|---|---|---|---|---|---|

| WORK IN PROGRESS  ORDER NO. | | | | | | |
|---|---|---|---|---|---|---|
| ARTICLE | | | | | ON ORDER | |
| QUAN. | TAGS ISSUED | A | B | TAGS COMPLETED | | |
| | | | | A | A | B | B |
| REMARKS | | | | | | |
| DEPT. | DATE IN CHECK WORK THRU | DATE PROMISED | DATE DELIV'RD | QUAN | TOTAL | |
| MILL | | | | | | |
| CABINET | | | | | | |
| FRAME | | | | | | |
| SET UP | | | | | | |
| FINISH | | | | | | |
| UPHOLSR'Y | | | | | | |

*Fig. 16*

| PRODUCTION and SALES 193__. | | | | | | | | | | | | | | | | | | | | | | | | | |
|---|---|---|---|---|---|---|---|---|---|---|---|---|---|---|---|---|---|---|---|---|---|---|---|---|---|
| QUANITY MANUFACTURED | | | | | | | | | | | | | QUANITY SOLD. | | | | | | | | | | | | |
| JAN | FEB | MAR | APRIL | MAY | JUNE | JULY | AUG | SEPT | OCT | NOV | DEC | TOTAL | JAN | FEB | MAR | APRIL | MAY | JUNE | JULY | AUG | SEPT | OCT | NOV | DEC | TOTAL |
| | | | | | | | | | | | | | | | | | | | | | | | | | |
| | | | | | | | | | | | | | | | | | | | | | | | | | |
| | | | | | | | | | | | | | | | | | | | | | | | | | |
| | | | | | | | | | | | | | | | | | | | | | | | | | |
| | | | | | | | | | | | | | | | | | | | | | | | | | |

*Fig. 14*

INVENTOR.
BY   *Henry Molz*

Patented Aug. 15, 1939

2,169,498

UNITED STATES PATENT OFFICE 2,169,498

DEVICE FOR CONTROLLING AND PLANNING PRODUCTION, ORDER DISPATCHING, STORES, AND SALES

Henry Molz, Glendale, Calif.

Application January 25, 1938, Serial No. 186,828

9 Claims. (Cl. 40—19.5)

This invention has relation specifically to planned control in manufacturing and embodies the principle of visual control in the art of dispatching orders, planning production, and securing perpetual stores inventories. It provides in a practical manner the device or means by which the desired result is secured.

The primary purpose of this invention is essentially the provision of a device by which the controlling heads of a business may readily analyze, standardize, organize, and unify conditions affecting the production, stores and sales problems of the business, whether manufacturing, wholesale or jobbing, and regardless of the nature of the product manufactured and sold.

Thus an essential object is the provision of a device providing a workable means for the production or stocking of a product, stock scheduled to the extent that it will keep the investment of labor busy, and the sales department continuously on mettle in order to achieve lower costs and larger profits.

A further essential object is the provision of a device to accomplish definite results, to bring out specific and uncontrovertible facts concerning the operations and activities of the business from every conceivable angle, and to make possible intelligent supervision and planning.

A most important object is the provision of a device providing a workable, thoroughly practical, simple and economical means designed to set up conditions at variance with the uncontrolled present day haphazard production and stockkeeping procedure in industry, for example, and to secure a systematic method that will assure positive and satisfactory results.

An important object is the provision of a method and the means for carrying it into effect, that will provide an instantaneous bird's-eye view of the activities of the business and showing actual stock on hand and held in reserve of each article and every component part thereof, one or a million; the total manufactured and the total sold, month after month, and every order in work and its progress thru the plant, as many months ahead as considered necessary without the necessity of wading through a mass of buried data.

A further important object is to provide a device of this scope that would invite positive investigation by its availability, and centering all information concerning the activities of the business, so as to show up requirements and the condition of deliveries at once and in advance of approaching shortages and delays, far enough ahead to permit of decisive action to meet the conditions thereby entailed.

A further important object is to provide such a device embracing said characteristics, and in which the separate units although highly essential to the complete fulfillment of the device within the above described scope, may nevertheless be installed in different sections and handled by the separate departments of the business as readily as in but one location and under the control of but one head, although the whole is preferably controlled from one point.

A further object is to provide a sectional and expandible device permitting the addition of one or more of the separate sections to meet the requirements of business growth, and which may readily and without difficulty be supervised and controlled by a person of average intelligence.

A further object is to provide a device adaptable either to attachment against the wall or other flat surface area of or within a building, or to a floor standard in which case the several units may be distributed on both sides of the standard for operation and use.

And a further object is to provide a device of said characteristics permitting interchangeable data to be provided for as would meet the conditions and precise requirements of the business in which it is installed. Flexibility in its uses and purposes of accomplishment comprise one of the paramount features of the device.

I attain these objects by the device illustrated in the accompanying drawings in which one each of the several units comprising the complete device is shown, it being understood that as many of said units as necessary may readily be combined, as the need of the business wherein it is installed, may from time to time require.

Figure 1 is an elevation of the assembled device;

Figure 2 is a section on the line 2—2 of Figure 1;

Figure 3 is a section on line 3—3 of Figure 1;

Figure 4 is a section on line 4—4 of Figure 1;

Figure 5 is a section on line 5—5 of Figure 1;

Figure 6 is a section on line 6—6 of Figure 1;

Figure 7 is a section on line 7—7 of Figure 1;

Figure 8 is a section on line 8—8 of Figure 1;

Figure 9 is a section on line 9—9 of Figure 1, and

Figure 10 is a section on line 10—10 of Figure 1;

Figures 11 and 12 are illustrative of typical form cards used in the device;

Figure 13 is an elevation of a perforated metal sheet employed in the construction of section B a component part of the device, and Figures 14, 15 and 16 are further indicative of typical form cards used in the device.

Similar numerals of reference indicate like parts throughout the several views.

The invention embodies a plurality of formed metal frame sections herein designated as A, B, C, D and E. The several sections are firmly secured in face alignment at the bottom in a channel member 10 wherein they rest, said channel member is secured to a suitable backing (building wall for example—not shown) by means of screws 10'. At the top, they are similarly held by means of a rail 11, screws 12 in like manner securing the rail to the backing, the rails shown comprising but one of many types equally adaptable.

The several sections vary in width, but are similar in most other respects. Formed of metal, each embraces a back portion 13 bent rearwardly and downwardly at the top so as to provide a hook or carrier means 14 adapted to engage the rail 11 for hanging the several sections in a vertical position. Said back portion 13 is further bent forwardly and then spaceably against itself to form a channel 15 at each of its sides and also at the bottom, the channels in sections A, C and D are thus adapted for the interchangeable engagement of card board sheets 15'; section B provides for permanent attachment of a cork base 16 and a perforated metal facing plate 17 positioned immediately thereover, while the channel in section E permanently secures a sheet of plywood 21, or other similar substance.

Forwardly of the back portion 13, sections A, C and D are provided with cross bars 19 suitably attached thereto, the same functioning as an abutting or rest stop for the card inserted in the sections, sections A and C each having a centrally positioned cross bar, section D having five thereof, the former holding two cards each, the latter six cards, it being understood that said sections may contain more or less of said cross bars, even none so as to embrace but one card or other writing surface each.

It is advisable that the several sections when mounted have their respective faces flush with one another. As sections B and E normally extend outwardly to a greater extent than do sections A, C and D, a suitable means to bring the faces of the latter group in alignment with the first named group must be employed. The ribs 20 disclose one means for the accomplishment of this. In lieu thereof, said sections may loosely engage a plywood filler over which a sheet or card form bearing the indicia comprising the form may be placed and as effectively secured.

The frame section E is further provided with a multiplicity of shoulder hooks 22, forty in number, thirty-one of which provide a hook for each day of a month, eight provide for a second and a third month by weeks, and the remaining or fortieth hook provides a so-called special hook which may be used for fractional parts of a month extending into a fifth week. Said frame section further embraces a plurality of numbered tacks 25, thirty-one in number, numbered consecutively from one up. They are placed in numerical order above the first thirty-one hooks, each of said hooks being thus designated as representative of a day of the month. Card holders 23 are further affixed to this section for the interchangeable engagement of title cards 24. The latter are used to designate the names of the month, the group of thirty-one hooks having but one such card holder, while each hook embracing a week of the succeeding two months is provided with one, as is also the special or partial fifth week hook.

The card board sheets 15' comprise forms printed to meet the requirements of the business wherein the device is installed. The printed form disclosed in Figure 11 is designed for engagement in the frame section A; that disclosed in Figure 12 for engagement in the frame section B, it forming a heading strip merely, and is indicative of the number of stock articles each of the divisional sections of the frame sections represent. The form disclosed in Figure 14 is arranged for engagement in the frame section C; that disclosed in Figure 15 in the frame section D, and that disclosed in Figure 16 embraces a tag form for use in connection with the hook members on the frame section E, one of said tags being issued for each job order in work.

The form disclosed in Figure 15 shows but three columns. A preferred full form consists of ten columns, one for each pattern number in work. It may as readily embrace more or less, although a ten columnar form appears to be ideal for the purpose described.

The tag shown in Figure 16 is reduced in length for lack of space, hence indicates but one column headed "Date deliv'r'd and Quan". In practice it should contain at least three each of said columns in pairs to provide for at least three partial delivery record spaces should the same be required.

Figure 12 discloses the perforated metal sheet or surface plate used in the frame section B, and having open sections preferably ¼ x ⅜ inch in size, the underlying cork surface is preferably ⅜ inch in thickness, as is also the plywood section embraced in the frame section E.

The information resulting from each day's business operations is to be recorded on the card forms while they are secured in the frame sections. In the frame section B it is of course only necessary to change the location of the so-called map tacks over the perforated cork faced section and to add additional map tacks as the needs require. A special cork base permanently resilient and compressible is employed. It will not bulge or soften at high temperatures nor shrink or harden at low temperatures. It withstands freezing and thawing. The plywood, too, is of selected stock to eliminate in so far as it is possible any of the foregoing conditions. Thus, the device, practically all metal in its structure, should last indefinitely and retain its serviceability without maintenance expense to the user. First cost is therefore practically the only cost. Nor should the expense of printed forms prove a drawback since the amount of copy entailed is practically nil, the forms at best comprising a ruling job, merely, moreover, for economy in use, paper or card stock may be printed on both sides to meet the specific requirements of one's business.

In view of the foregoing, it should be apparent that the invention readily admits of extensive latitude in securing the detailed information desired. The nature and extent of each business wherein it is installed, coupled with the volume of detail desired alone governing the comprehensiveness the device will entail.

As shown, the drawings illustrate a complete unified scheme for visibly recording the daily operations and business transactions of a woodworking plant producing furniture. This is for illustrative purposes only. Obviously, they may readily be changed to meet the precise requirements of any other line of business. It is a printing job merely. And by adding additional like sections to meet the increased production and stock requirements of larger plants, the flexibility of the invention makes it of untold value in any industry. And, as hereinbefore set forth, the stock and sales control sections are as adaptable to a non-producing business, wholesaler or jobber, as they are to the manufacturer.

In order that the invention may readily be produced by those skilled in the art, and as readily adaptable to any business, the device shown will now be more fully explained, changes to meet the peculiarities and conditions of every type of business, from the herein explanation being quite obvious.

The separate units comprise component parts of the whole. Each is subservient to the other. The first section provides for the attachment of a movably positioned card, ruled and printed, to embrace a heading meeting the requirements of the products of the business. It incorporates a suitable card holder means which permits use of the card by merely removal of the same without the use of any fastening means, by the simple operation of convexly curving the same at its medial portion.

Although the meaning of the heading should be clear, an explanation is nevertheless deemed advisable.

The "Pattern number" of the article is written in the first column, each pattern on a separate line. Next, the name of the "Article", followed by its "Color" (the same table, chair, etc., quite often being carried in stock in different finishes, brown mahogany, red mahogany, walnut, Italian oak, etc.), a separate column for each finish being used, then follow columns for indicating the total quantity "On order" in the plant or on outside purchase as the case may be, the "Date expected", the quantity actually "In the finishing department", signifying that said quantity may be expected in stock within a few days at the most, the quantity in stock unassembled or "Knocked down" as more commonly known, then the quantity assembled or "Set up" but unfinished, and finally, the quantity in stock, sold but held "In reserve" awaiting shipment. To the executive heads of a furniture manufacturing plant, all of said information is of inestimatable value. Similar information meeting the conditions of every other line of manufacture would be of equal value.

The next section is a continuation of the first section. They go hand in hand. The one without the other would be of no avail. It comprises a multiplicity of spaced sections having a cork base. It is adaptable to the utilization of the so-called "Maptacks". The heading strip requires no explanation. The unit forms a perpetual inventory record of the stock on hand, as well as on order but over sold. All black-headed maptacks in line indicate the total stock of the particular pattern on hand. Conversely, all red-headed maptacks indicate the total stock of the particular pattern over sold. To illustrate, a black-headed maptack in the "400", "50" and "4" columns would indicate a total of 454 of the pattern in stock. Red-headed maptacks in the same column and spaces would indicate that the same number are sold, delivery, however, being impossible for the lack of stock from which the order or orders may be filled.

The third section is adopted to hold a card or sheet preferably columnar ruled and headed to indicate by months, all purchases or production of the several items carried and the respective sales thereof, together with the aggregate totals thereof for the year. There is thus established an accurate bird's-eye view of the activities of the business month after month, and the relative value of the respective items carried as business producers and profit builders for like periods of time.

The fourth section is adopted for the placement of a plurality of card forms vertically and horizontally ruled to form a plurality of spaced sections, and wherein a record of each day's production of the several articles by their respective pattern numbers as listed thereon may be inserted to indicate the daily production activities of the business.

All of the spaced sections provided in the first column, and certain thereof in the remaining columns bear printed indicia to form a guide means for the proper recordation of said production activities under a planned and schedule sequence of operation in keeping with the specific requirements of the business.

Thus, starting at the top of the card, the respective headings within the first column read downwardly as follows:

"Pattern", "On order", "Total out", "Balance due", "Wanted this month", "Wanted per day", "Daily production", and, continuing downwardly in numerical sequence beginning with number 31 to and inclusive of number 1, said numerals indicating the respective days of a month.

Beginning with the heading "Daily production", the respective columns beginning with the second column are further divided to form two sections in each, the left hand section is headed "Out" and the right hand section is headed "Total".

Figure 15 of the accompanying drawings plainly shows the form as thus described.

It will be seen that this record will enable the executives of the plant to fortify themselves with regard to the activities of the business. The record in no unmistakable manner indicating whether production is ahead or behind.

Obviously, as many sections of each of said units may be joined as would be necessary to meet the requirements of each particular plant, the approximate number of patterns carried and orders generally in work being the deciding factor.

The last section completes the device. It comprises a series of hooks, one for each day of the month. Provision is made for a second and a third month by weeks, and a special hook which may be utilized as the fifth week hook for any fifth week month. Upon the hooks printed tags are hung, a tag for every job in work. The tag provides spaces for indicating the "Order number", name of "Article", quantity "On order" or sold against the "Quantity" to be produced, the quantity to be produced, and a "Remarks" space. Provision is also made by spaces headed "Tags issued" "A"—"B" and "Tags completed" "A"—"B". The letters "A" and "B" indicate separate production chasers. More than two chasers may be required in some plants. In others one would be sufficient. Each chaser would handle certain departments, hence the reason for showing the number of tags issued and in work bearing the same order number. The space "Tags completed" provides a means for indicating that fact. In following a tag, the chaser is thereby apprised of the fact that other tags bear the same order, and that these must be given due attention as well.

Looking at the tag sideways, the respective plant departments are shown. The date each department starts the order is entered in the "Date in work" column. When the tag is issued, a check mark is made in the column "Check thru" opposite each department having anything to do with processing the order. Blank spaces are provided for writing in special departments where the work is such that it requires outside processing, ornamental iron work, for example, and not a regular department of the plant.

Upon starting the job, the chaser writes in the promised date in the "Promised" column (date secured from department foreman), the date of delivery is written in the "Date delivered" column, and the quantity delivered is written in the "Quan" column. Additional spaces are provided for recording additional deliveries when partial deliveries are made.

The tags are hung on the hook corresponding with the promised date of delivery. As each month elapses and the hooks of said month are freed, the tags on the two succeeding months' hooks are moved upward one month, the tags of each week of the second month being distributed over the first month's hooks by days in accordance with their respective promised dates. Then the tags on the special hook are distributed by weeks on the freed hooks of the third month by weeks. On each such monthly change the name of the month is changed in keeping therewith, the card holders provided furnishing a ready means for the accomplishment of the same.

It should be apparent that the scope and operation of said section will unmistakably solve the unreliable shop order methods prevailing in the average plant. It will materially speed up production and assure distinctly better working conditions. It will assure filling of orders on time, and make possible more pleasant general conditions, contact and relations with customers.

The order dispatching unit provided for furnishes a visualized record of all jobs being worked upon, as well as next job ahead by preference. It leaves nothing to guess work, offers a positive assurance as to when a job is to be placed in work, when it may reasonably be expected to be completed, and shows at a glance how it is progressing through the plant.

The tags used with this section and the printed cards used with the first section are the only printed forms requiring special printing to meet the precise requirements of the business wherein the device is to be installed. All the other forms provided are standard regardless of the nature of the business and the article manufactured and sold.

Produced from materials readily obtainable in the open market, the device furnishes a simple, reliable and comprehensive means for accomplishing the results claimed in a compact unitary structure operatable by one person.

As many apparently different embodiments and changes in construction of this invention could readily be made without departing from the scope thereof as herein shown and described, it is intended that the description and drawings shall be interpreted as illustrative and not in a limiting sense.

It is also to be understood that the language used throughout, inclusive of the claims, is intended to cover all the generic and specific features of the invention, and all statements of the scope thereof, which as a matter of language, might be said to fall therebetween.

Having thus described my invention, what I claim as new and novel, and desire to secure by Letters Patent is:

1. A manually operable recording device comprising a physical structure having a hook extending portion integrally formed thereof, a means for removably securing thereto data recording material, a hang rail, said hook extending portion arranged to extend over and downwardly and about said hang rail, a channel rail, said recording device positioned in said channel rail, said first named rail and said second named rail cooperating to secure said recording device in slidable and removable relation in vertical position to a supporting structure, and whereby said recorded data on said recording device is visibly brought to view to produce tangible results from the operation of said device.

2. A manually operatable device, comprising a longitudinal frame member, a permanently resilient base portion secured thereby, a perforated metal facing plate fixedly secured to said frame member and against said permanently resilient base portion, said facing plate dividing the latter into a plurality of sections and adapted to individualize said resilient base portion as to each of said sections and for the insertion of headed pointed members, headed pointed members, means for designating each of said plurality of sections and cooperating with said headed pointed members in the designation of each of said sections, and means for vertically securing said device to a supporting structure in slidable and removable relation thereto.

3. A manually operatable device, comprising a longitudinal frame member, a permanently resilient base material secured thereto, a perforated facing plate affixed thereover and secured to said longitudinal frame member, said facing plate dividing said resilient base material into a plurality of spaced sections, headed pointed members, a spaced portion atop said facing plate and providing an open portion of said resilient base material, a card laid thereover and secured to said device, and having indicia indicative of the use and purpose of said plurality of spaced sections, said indicia and said headed pointed members cooperating to individualize each of said sectional spaces of said resilient base material formed by said perforated facing plate, and means for vertically securing said frame to a vertical surface, and in slidable and removable relation thereto.

4. In a manually operatable stock control recording device, a longitudinal frame adapted to receive and retain a resilient base material, a resilient base material fixedly secured therein, a perforated metal facing plate forming a plurality of sections fixedly secured to said frame and overlying a portion of said resilient base material, said resilient base material adapted to retain pointed members stuck therein and within the confines of said plurality of sections of said perforated metal facing plate, pointed members, said portion of said resilient base material uncovered by said perforated metal facing plate providing a spaced area for removably securing a card to said frame, said card in secured relation with said frame providing an indicia bearing means descriptive of the separate sections comprising said plurality of sections formed by said perforated metal facing plate, said recording device having a hook hanging means integral therewith and adapted to overlap a hang rail and to conceal the same from view, a hang rail, said hang rail adapted to receive said hook integral with said recording device, a channel rail, said recording device slidably positioned in said channel rail in hanging position with said hang rail, and cooperating one with another to secure said control device in vertical position to a vertical structure.

5. A manually operatable recording device arranged to secure a plurality of writing surfaces, and including a longitudinal frame member adapted to receive and retain said writing surfaces in a removable manner, and having a hook engaging means integrally therewith for vertically hanging the same, said hook engaging means extending outwardly, backwardly and downwardly of said frame member, a hang rail, said hang rail adapted to receive said hook in overlapping engagement therewith and to conceal said hang rail thereby, a channel rail, said channel rail cooperating with said hang rail to secure said recording device to an upright structure, means for removably securing said writing surfaces to said recording device and for securely juxtapositioning the same for operation and use.

6. A manually operatable device comprising a frame member having a hook means integral therewith and adapted for over-lapping engagement with a hang rail for vertically hanging the same, a hang rail, said frame member embracing a plurality of sectional portions in spaced relation with one another and adapted to fixedly or removably receive a plurality of writing surfaces, cards, slate and blackboard pieces or the like, for example, a channel rail, said frame member slidably positioned in said channel rail in hanging relation with said hang rail, and whereby said manually operatable device may be vertically secured to an upright supporting structure for visibly portraying indicia and data printed and recorded on said several writing surfaces in said plurality of spaced sectional portions, and against outward movement therefrom.

7. A device of the class described, manually operatable for production planning, and comprising a frame having card engaging means integral therewith, said frame adapted to securely embrace a plurality of cards, cards mounted thereon, a hang rail, means integral with said frame for engaging the latter to said hang rail, a channel rail, said rails cooperating with one another for vertically securing said device to a supporting structure, wall or the like, and in slidable and removable relation therewith.

8. A device of the class described, and comprising a manually operatable job order control means having a hook portion extending outwardly, backwardly and downwardly therefrom and integral therewith, a hang rail, said hook portion overlapping the same, said device provided with a plurality of tag retaining members, means for individually identifying each of said tag retaining members, card holders, said card holders positioned adjacent certain of said tag holder retaining members, and a channel rail cooperating with said hang rail for vertically supporting said device, slidably and removably secured to a supporting structure.

9. A device of the class described, and comprising a vertically positionable manually operatable job order control means, said device comprising a frame adapted to retain a ply-wood base, hooks engaging said base, means cooperating with said hooks for identifying the job order control means incorporated in the uses and purposes of said hooks, and means for vertically securing said device to a supporting structure, wall, standard, or the like.

HENRY MOLZ.